United States Patent
Lin et al.

(10) Patent No.: US 11,561,807 B2
(45) Date of Patent: *Jan. 24, 2023

(54) DESKTOP LAUNCHER

(71) Applicant: MICROSOFT TECHNOLOGY LICENSING, LLC, Redmond, WA (US)

(72) Inventors: Gang Lin, Redmond, WA (US); Jing Guan, Redmond, WA (US); Jiewei Xu, Redmond, WA (US); Wenfeng Zeng, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,715

(22) Filed: Jul. 1, 2021

(65) Prior Publication Data

US 2021/0326154 A1 Oct. 21, 2021

Related U.S. Application Data

(63) Continuation of application No. 16/603,026, filed as application No. PCT/CN2017/079472 on Apr. 5, 2017, now Pat. No. 11,080,069.

(51) Int. Cl.
*G06F 3/0482* (2013.01)
*G06F 9/451* (2018.01)
*G06F 3/04817* (2022.01)

(52) U.S. Cl.
CPC ............ *G06F 9/451* (2018.02); *G06F 3/0482* (2013.01); *G06F 3/04817* (2013.01)

(58) Field of Classification Search
CPC ..... G06F 9/451; G06F 3/04817; G06F 3/0482
See application file for complete search history.

(56) References Cited

U.S. PATENT DOCUMENTS

| | | | |
|---|---|---|---|
| 9,654,598 B1 * | 5/2017 | Crawford | H04W 4/023 |
| 2007/0038934 A1 | 2/2007 | Fellman et al. | |
| 2015/0095820 A1 * | 4/2015 | Fellman | G06F 3/04847 |
| | | | 715/765 |
| 2015/0346957 A1 * | 12/2015 | Louch | G06F 3/04842 |
| | | | 715/765 |

(Continued)

FOREIGN PATENT DOCUMENTS

| | | |
|---|---|---|
| CN | 104270514 A | 1/2015 |
| CN | 105373381 A | 3/2016 |

OTHER PUBLICATIONS

Nassim Laga et al., Widgets to facilitate service integration in a pervasive environment, May 1, 2010, IEEE Communications Society, pp. 1-5 (Year: 2010).*

(Continued)

*Primary Examiner* — Tam T Tran
(74) *Attorney, Agent, or Firm* — Workman Nydegger

(57) ABSTRACT

The disclosure relates to a method for providing a user customized card in a launcher. A card list is presented in the launcher. One or more customizable cards are provided in response to a user input. A user selection of one of the one or more cards is received. Customization of the selected card is executed based on user inputs. The customized card is presented in the card list.

20 Claims, 15 Drawing Sheets

(56) References Cited

U.S. PATENT DOCUMENTS

2017/0329500 A1* 11/2017 Grammatikakis .... G06F 3/0483

OTHER PUBLICATIONS

Nassim Laga et al., Building a user friendly service dashboard: Automatic and non-intrusive chaining between widgets, Jul. 1, 2009, IEEE Computer Society, pp. 484-491 (Year: 2009).*
"Second Office Action and Search Report Issued in Chinese Patent Application No. 201780038007.4", dated Feb. 25, 2022, 15 Pages.
"First Office Action and Search Report Issued in Chinese Patent Application No. 201780038007.4", dated Jul. 30, 2021, 14 Pages.
Zhijun, Wang, "Nine Application Skills for Apple I Family", In Computer Knowledge and Technology, vol. 8, Issue 5, Aug. 5, 2016, 8 Pages.
"Office Action Issued in Indian Patent Application No. 201917039224", dated Jan. 31, 2022, 6 Pages.
U.S. Appl. No. 16/603,026, filed Apr. 5, 2017.
"Office Action Issued in European Patent Application No. 17904415.1", dated May 27, 2022, 9 Pages.
"Third Office Action Issued in Chinese Patent Application No. 201780038007.4", dated Jun. 6, 2022, 14 Pages.
"Office Action Issued in Chinese Patent Application No. 201780038007.4", dated Aug. 9, 2022, 16 Pages.

* cited by examiner

DESKTOP LAUNCHER

CROSS-REFERENCE TO RELATED APPLICATIONS

This application is a continuation of U.S. patent application Ser. No. 16/603,026, filed Oct. 4, 2019, which was the National Stage of International Application No. PCT/CN2017/079472, filed Apr. 5, 2017, which applications are hereby incorporated by reference in their entirety herein. To the extent appropriate a claim for priority is made to the above disclosed applications.

BACKGROUND

A desktop launcher provides a user interface (UI) for a user as a start point to operate at a computing device. For example, a launcher provides shortcuts to application programs in its UI, so that the user may start the application programs by operating the shortcuts. Examples of a mobile device launcher include open-sourced Android launcher, default launcher from iOS device or Windows Phone (WP) device.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure may provide an improved launcher. A card list is presented in the launcher. One or more customizable cards are provided in response to a user input. A user selection of one of the one or more cards is received. Customization of the selected card is executed based on user inputs. The customized card is presented in the card list.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

As used herein, the term "includes" and its variants are to be read as open terms that mean "includes, but is not limited to". The term "based on" is to be read as "based at least in part on". The terms "one embodiment" and "an embodiment" are to be read as "at least one implementation". The term "another embodiment" is to be read as "at least one other embodiment". The term "a" or "an" is to be read as "at least one". The terms "first", "second", and the like may refer to different or same objects. The terms "a subset" is to be read as "at least one", for example, a subset of A, B and C is to be read as at least one of A, B and C and include all of A, B and C. Other definitions, explicit and implicit, may be included below. A definition of a term is consistent throughout the description unless the context clearly indicates otherwise.

Figure 1:
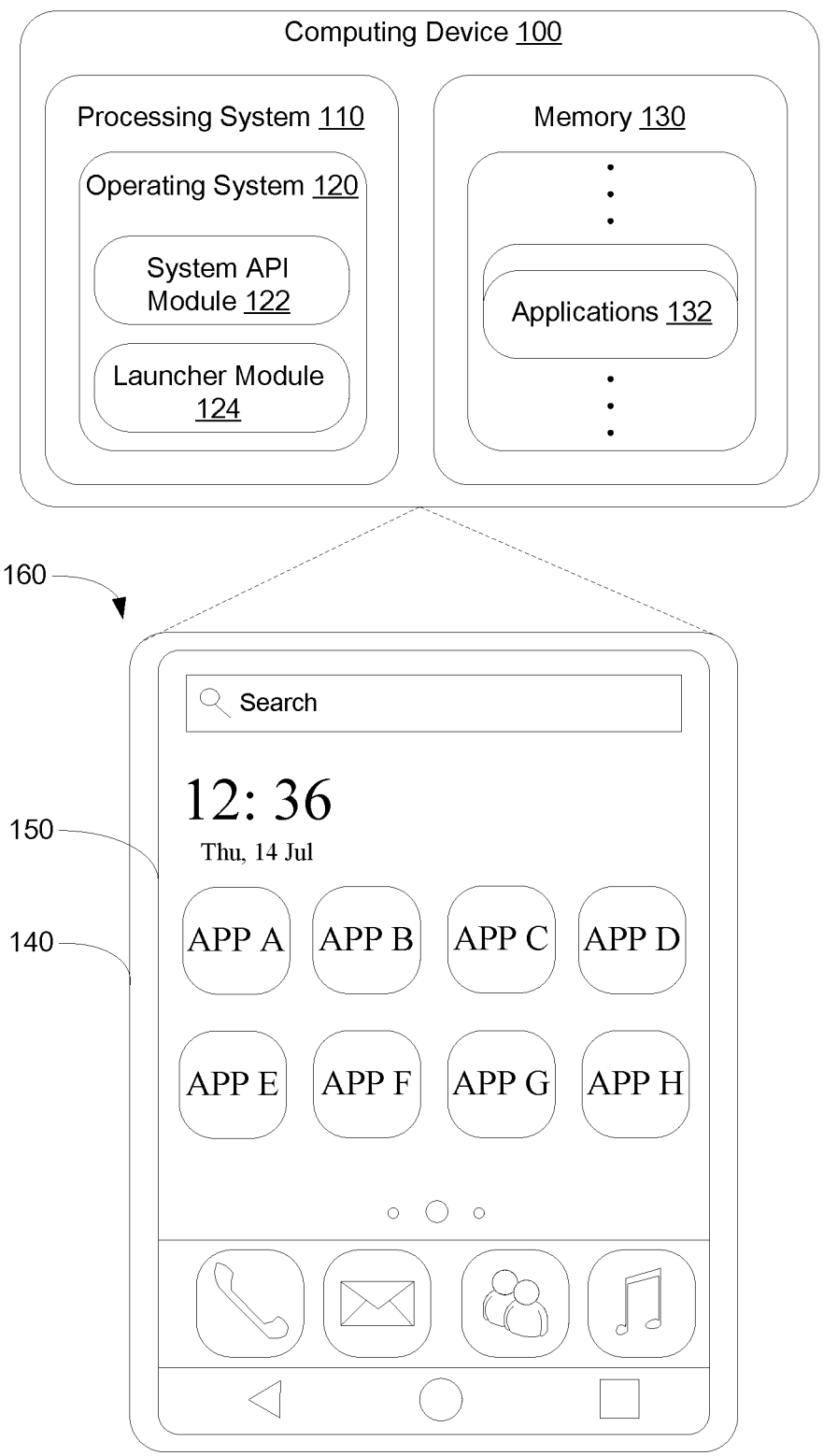
FIG. 1 illustrates an exemplary environment application where the described techniques can be implemented.

FIG. 1 illustrates an exemplary environment where embodiments of the disclosure can be implemented. It is to be appreciated that the structure and functionality of the environment are described only for the purpose of illustration without suggesting any limitations as to the scope of the disclosure. The disclosure can be embodied with a different structure or functionality.

The illustrated environment includes a computing device 100, which is illustrated as a mobile computing device (e.g., a mobile phone) having a housing 140. A variety of other configurations of the computing device 100 are also contemplated. For example, the computing device 100 may be configured as a traditional computer (e.g., a desktop personal computer, laptop computer, and so on), a mobile station, an entertainment appliance, a wireless phone, a tablet, a netbook, and so forth. Thus, the computing device 100 may range from full resource devices with substantial memory and processor resources to a low-resource device with limited memory and/or processing resources. The computing device 100 may also relate to software that causes the computing device 100 to perform one or more operations.

The computing device 100 is also illustrated as including a displayer 150, a processing system 110, and an example of computer-readable storage media, which in this instance is memory 130. The memory 130 is configured to maintain applications 132 that are executable by the processing system 110 to perform one or more operations.

The processing system 110 is not limited by the materials from which it is formed or the processing mechanisms employed therein. For example, the processing system 110 may be comprised of semiconductor(s) and/or transistors (e.g., electronic integrated circuits (ICs)), such as a system on a chip, processors, central processing units, processing cores, functional blocks, and so on. In such a context, executable instructions may be electronically-executable instructions. Alternatively, the mechanisms of the processing system 110, and thus of the computing device 100, may include, but are not limited to, quantum computing, optical computing, mechanical computing (e.g., using nanotechnology), and so forth. Additionally, although a single memory 130 is shown, a wide variety of types and combinations of memory may be employed, such as random access memory (RAM), hard disk memory, removable medium memory, and other types of computer-readable storage media.

The computing device 100 is further illustrated as including an operating system 120. The operating system 120 is configured to abstract underlying functionality of the computing device 100 to applications 132 that are executable on the computing device 100. For example, the operating system 120 may abstract the processing system 110, memory 130, network, input/output, and/or display functionality of the displayer 150, and so on such that the applications 132 may be written without knowing how this underlying functionality is implemented. The application 132, for instance, may provide data to the operating system 120 to be rendered and displayed by the displayer 150 without understanding how this rendering will be performed. The operating system 120 may also represent a variety of other functionality, such as to manage a file system and user interface that is navigable by a user of the computing device 100.

The operating system 120 may be configured to process a variety of different input/output functionality supported by the computing device 100. Thus, the operating system 120 includes functionality relating to recognition of inputs and/or provision of outputs by the computing device 100 as well as devices used to detect those inputs. For example, the operating system 120 may be configured to identify gestures and cause operations to be performed that correspond to the gestures, and so on. The inputs may be detected for processing by the operating system 120 in a variety of different ways. For example, the operating system 120 may be configured to receive one or more inputs via touch interaction with a hardware device, e.g., fingers of a user's hand detected using touchscreen functionality of the displayer 150, via a natural user interface (NUI) with an image capturing device (e.g., a camera), via a cursor control device (e.g., a mouse), a remote control (e.g. a television remote control), and so on.

The operating system 120 may also represent a variety of other functionality, such as to manage a file system and a UI that is navigable by a user of the computing device 100. An example of this is illustrated as a launcher module 124 that is representative of functionality to implement a desktop launcher, an example of which is illustrated as a start screen or a home screen which provides a UI, that is, a desktop, for accessing applications or contents represented by the icons. Various configurations are contemplated, such as a desktop or UI that includes a single screen on a display area of the displayer or includes multiple screens which are switchable on the display area of the displayer. It should be appreciated that the terms launcher, desktop, and UI may be utilized interchangeably in some contexts. And it should be appreciated that although the launcher module 124 is shown as being implemented or integrated in the operating system 120, it's also possible to implement a launcher as an application 132, i.e., a launcher application may be executed at the computing device 100 to provide the desktop or UI 160.

The launcher 160, which may also be referred to as the UI 160 of the launcher, includes representations of a plurality of the applications or content 132, such as icon, tiles, textual descriptions, and so on, and may be configured in a variety of ways. The launcher 160, for instance, may be configured as a root level of a hierarchical file structure, e.g., each of the other levels is beneath the root level in the hierarchy. The representations shown in the illustrated example are selectable to launch a corresponding one of applications 132 for execution on the computing device 100. In this way, a user may readily navigate through a file structure and initiate execution of applications 132 of interest. Other configurations are also contemplated, examples of which are discussed in the following and shown in corresponding figures.

The operating system 120 is also illustrated as including a system API module 124 that is configured to provide various system APIs for other modules or applications. Various operations may be implemented by calling the system APIs, examples on the operations include opening an application, opening a picture, a video, a music and so on, receiving various messages, or the like. In one or more implementations, various messages or contents may be obtained by monitoring the related system APIs without executing the corresponding applications 132. This may be used to improve battery life and performance of the computing device 100 by not running each of the applications 132 to output the messages.

Output of the launcher 160 may be initiated in a variety of ways. In the illustrated example, the launcher 160 is initiated once the computing device 100 and the operating system 120 are turned on. In another example, a launcher application 132 may be executed at the computing device 100 to provide the UI of the launcher application 132. In this way, the UI of the launcher application 132 may replace the UI of the launcher integrated in the operating system 120.

It is illustrated that a home screen of the UI of the launcher 160 includes various components such as a search box at the top of the UI, time and date, and icons "APP A" to "APP H" representing respective applications, three small circles, icons of applications denoted by shapes of telephone, envelope, human, and musical note, and operation symbols denoted by a triangle, a circle and a square. It should be appreciated that the icons of applications may be in various forms in addition to the illustrated text "APP A" to "APP H", the graph shapes. The text "APP A" to "APP H" just represents the name of the applications that are installed at the computing device 100, but does not refer to the order of the applications. The three small circles imply that there are three screens currently in the UI of the launcher, the bigger circle in the middle indicates the relative position of the current screen among the three screens. For example, a right swipe operated on the current screen may allow another screen at the left of the current screen in the UI to be displayed on the display area of the displayer 150, and a left swipe operated on the current screen may allow another screen at the right of the current screen in the UI to be displayed on the display area of the displayer 150. It should be appreciated that the UI of the launcher 160 is just an example, various variations are apparent for those skilled in the art.

Figure 2:
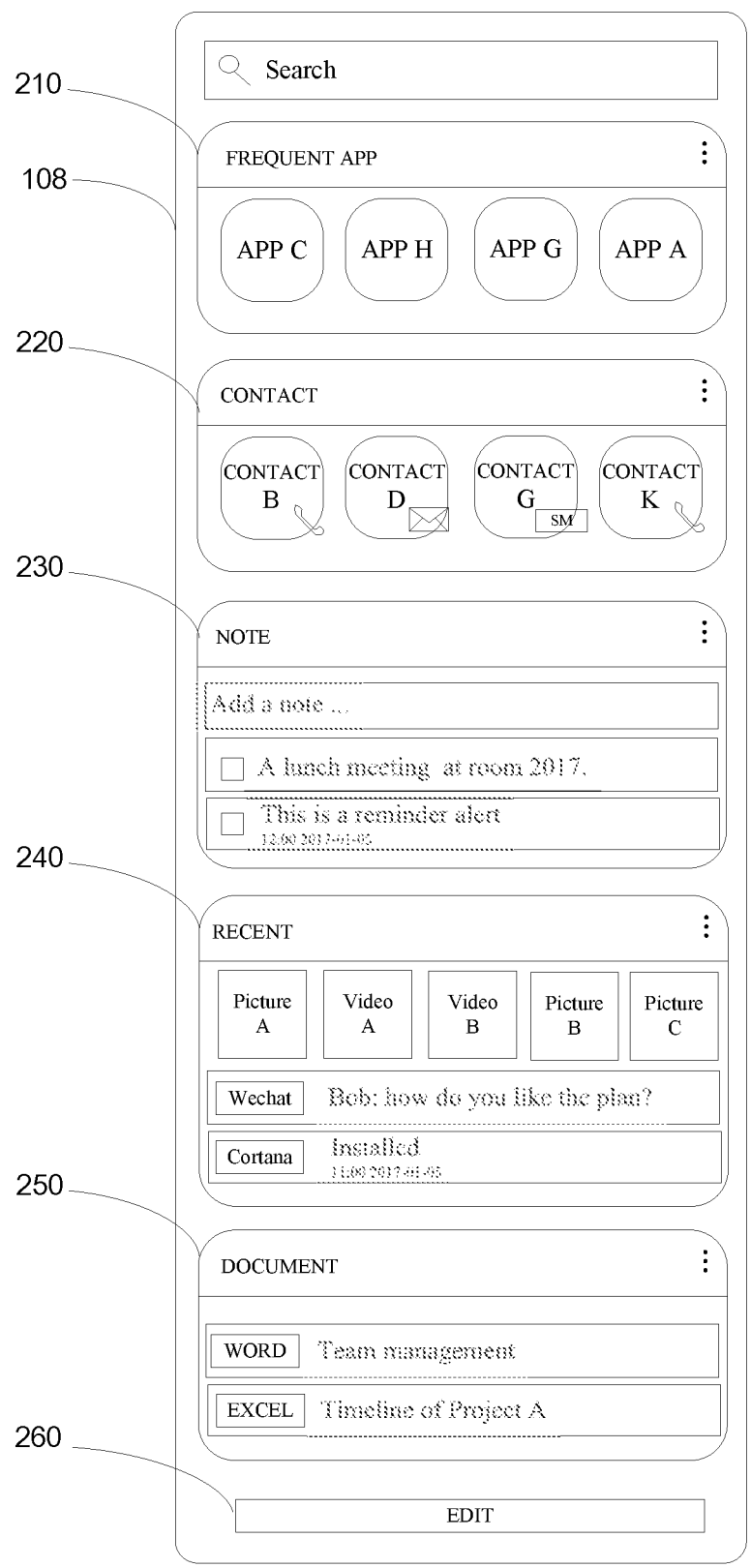
FIGS. 2-11 each illustrates an exemplary part of a UI of a launcher according to an embodiment.

FIG. 2 illustrates an exemplary part of a UI of a launcher according to an embodiment. The same label numbers in different Figures refer to same or corresponding elements.

In an implementation, the screen in FIG. 2 is displayed on the displayer 150 in place of the home screen in FIG. 1 after a right swipe operation is performed on the home screen. Therefore the screen in FIG. 2 may be referred to as minus one screen. It should be appreciated the screen in FIG. 2 is not necessary to be positioned at this position relative to the home screen, and may be at any position among the multiple screens of the UI of the launcher. It is illustrated that the minus one screen appears to be larger than the display area of the displayer 150, and under such circumstance, the minus one screen may be a scrollable screen and be scrollably displayed on the display area of the displayer 150.

It is illustrated that a card list is presented in the UI of the launcher. The card list currently includes cards 210 to 250. Each card is of a category such as frequently used application 210, contact 220, note 230, recent 240 and document 250. Each card includes contents or content related items associated with the category of the card, in other words, the contents or content related items are collected or grouped in one card according to the category of the card. For example, the content of card 210 relates to frequently used applications, the content of card 220 relates to contacts, the content of card 230 relates to notes, the content of card 240 relates to recently occurred content or events at the computing device 100, and the content of card 250 relates to documents. It should be appreciated that there may be various cards and corresponding contents in addition to the illustrated cards in FIG. 2, for example, the contents may also comprise news, music, video, picture, and so on.

The EDIT button 260 allows a user to edit the card list presented in the minus one screen. For example, the user is allowed to manage the cards, such as deleting some cards and/or adding some cards in the card list by using the edit function.

Figure 3A:
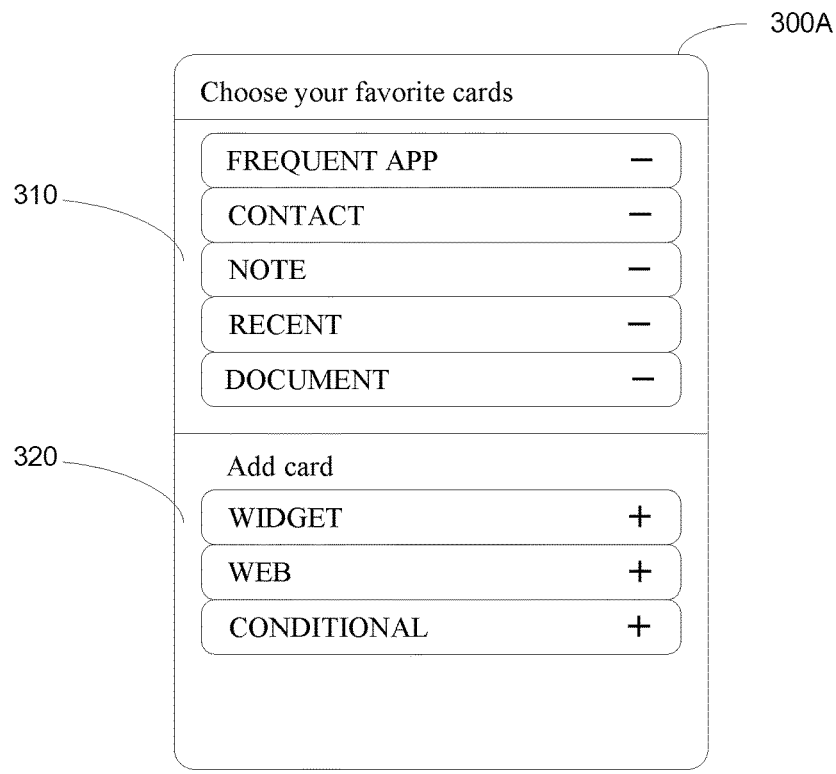

FIG. 3A illustrates an exemplary part of a UI of a launcher presented when the EDIT button 260 is pressed by the user. The UI 300A allows the user to edit the card list by adding or removing cards. For example, the area 310 presents representations of the current cards in the card list in the minus one screen, and the area 320 presents representations of available cards that can be added in the card list. A card may be removed from the card list when a user presses the corresponding subtraction sign in the area 310, or may be added to the card list when a user presses the corresponding plus sign in the area 320.

Figure 3B:
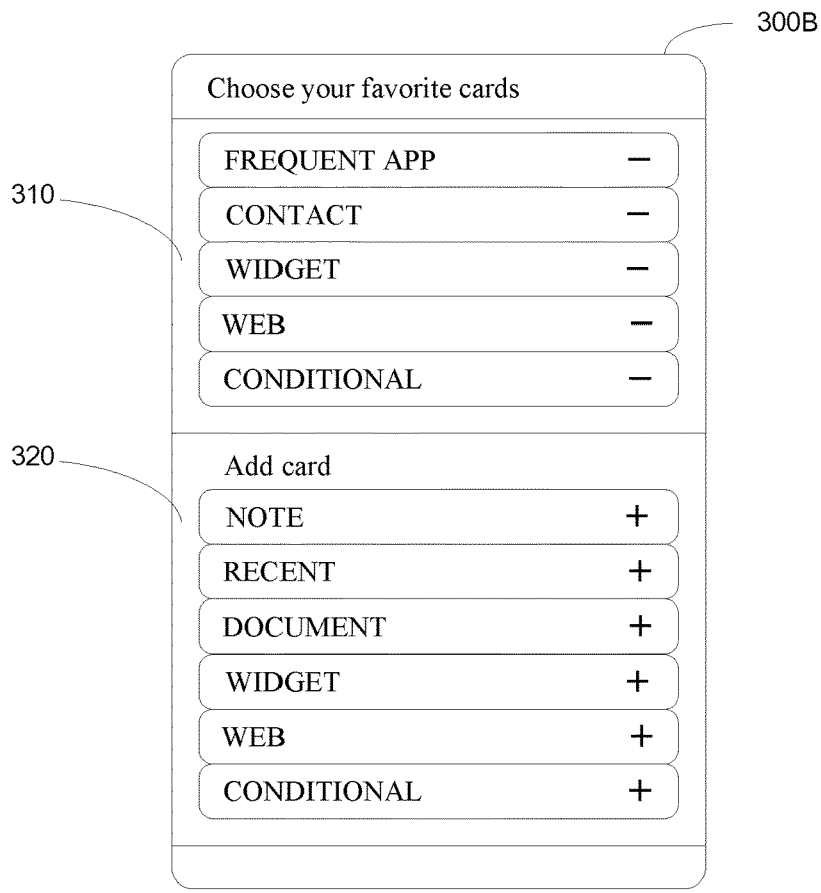

For example, as illustrated in the exemplary part 300B of the UI of the launcher in FIG. 3B, customizable cards named WIDGET, WEB, CONDITIONAL may be added from the candidate list shown in area 320 into the card list shown in area 310, and cards named NOTE, RECENT, DOCUMENT may be moved from the card list shown in area 310 to the candidate list shown in area 320.

As illustrated in FIG. 3B, the representations of the customizable cards such as WIDGET, WEB, CONDITIONAL are still shown in the candidate area 320 after the customizable cards are added into the card list. That is to say, for one customizable card, one or more copies of the card may be added in the card list and may be customized by the user. It should be appreciated that the disclosure is not limited thereto, and the customizable cards may also be moved from the candidate area 320 to the card list area 310 without remaining in the candidate area 320.

Figure 4:
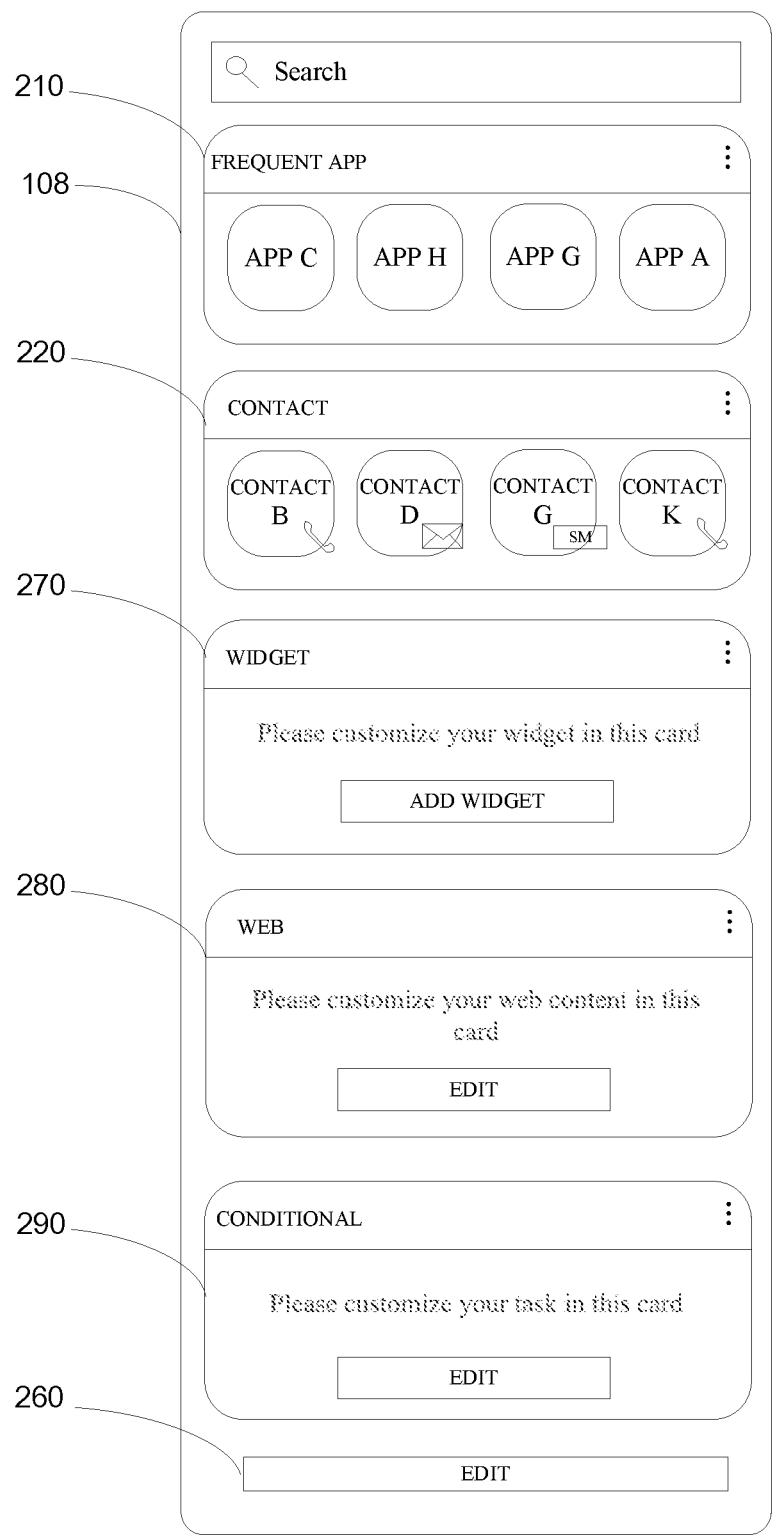

FIG. 4 illustrates an exemplary part of the UI of the launcher after the edition shown in FIG. 3B. The card list including cards 210 to 250 shown in FIG. 2 changes to the card list including cards 210-220 and 270-290 shown in FIG. 4 after the edition shown in FIG. 3B.

The widget card 270, web card 280 and conditional card 290 may be customized by users so as to meet various special requirements of the users. For example, the widget card 270 may be edited or customized by pressing the ADD WIDGET button, the web card 280 and the conditional card 290 may be edited or customized by pressing the EDIT button. The ADD WIDGET button in card 270 is also an edit button in substance. It should be appreciated that the terms edit and customize may be interchangeably used in the disclosure.

Although it is illustrated in FIG. 4 that a customizable card is firstly presented in the card list and then is edited or customized, it should be appreciated that editing or customizing of a customizable card may be performed when the card is chosen in the UI of FIG. 3A or FIG. 3B, and then the edited or customized card may be presented in the card list. The disclosure is not limited to the order of the editing of the customizable card and the presenting of the customizable or customized card in the card list.

Figure 5A:
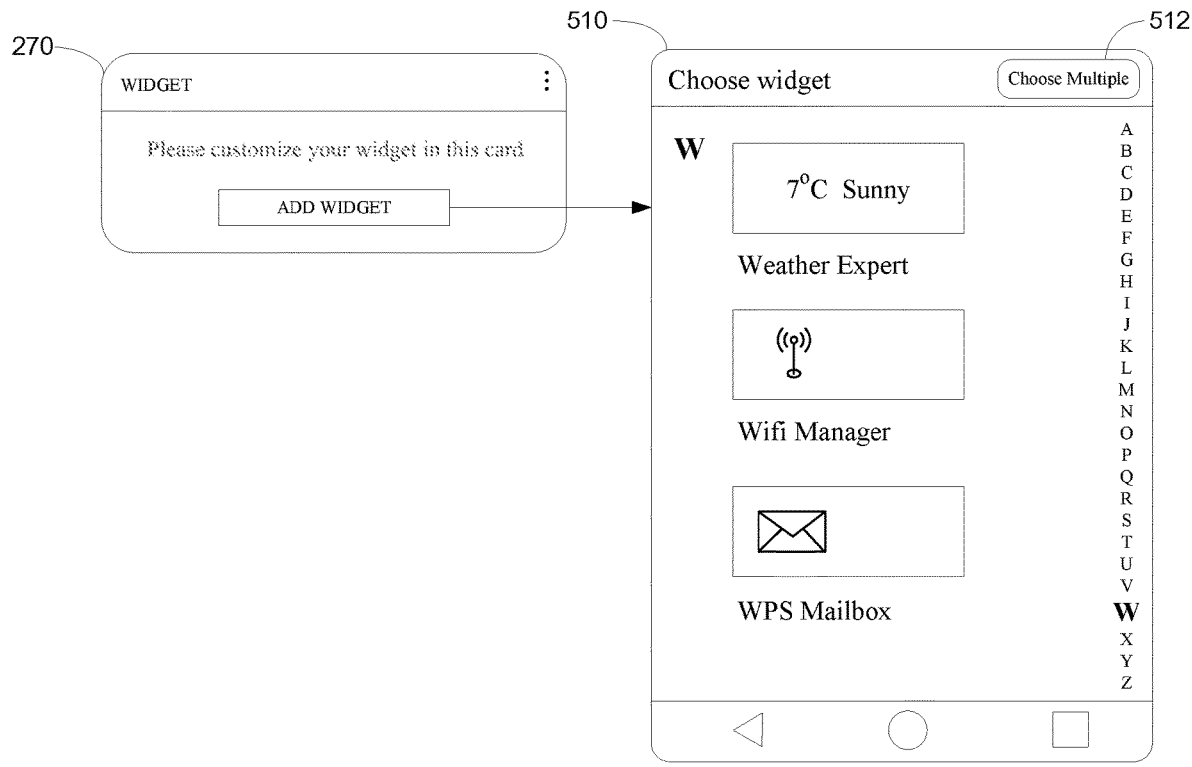

FIG. 5A illustrates an exemplary customizing of a widget card according to an embodiment. The user may press the ADD WIDGET button on the card 270 in the card list of the launcher shown in FIG. 4. After receiving the user input, available widgets may be presented in the UI 510 named choose widget. In the illustrated example of FIG. 5A, the available widgets are presented in an alphabetical order of the names of the widgets, and three exemplary widgets named "Weather Expert", "Wifi Manager" and "WPS Mailbox" are illustrated.

Figure 5B:
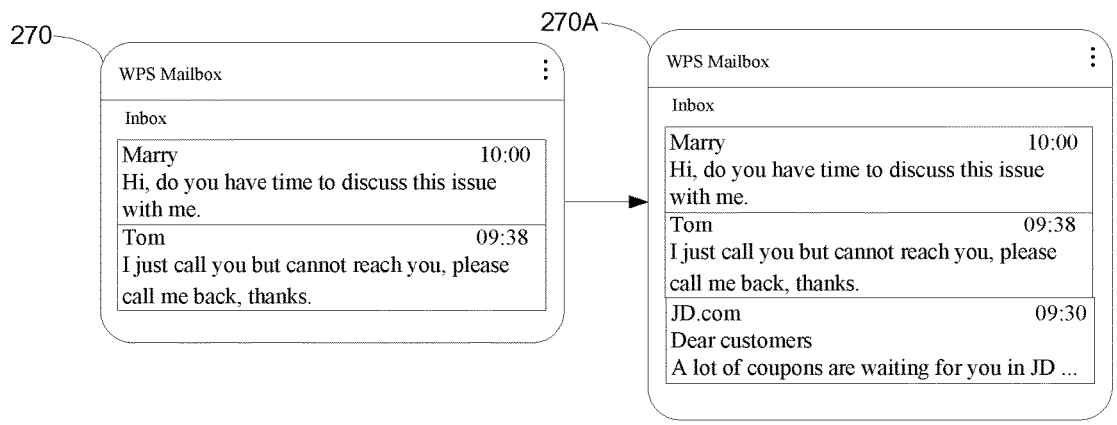

FIG. 5B illustrates an exemplary customized widget card 270 after the user chooses a widget named "WPS Mailbox". After the widget is incorporated in the customized widget card 270, the functions and data provided by the widget may be conveniently access by the user through the customized widget card 270 in the card list. For example, the emails in the inbox of the WPS mailbox may be accessed in the card list without needing to open the application of the WPS Mailbox.

In an implementation, the customizable card 270 may be changed in size in adaption to the size of the widget when the widget is added in the card 270. In another implementation, the widget may be resized by the user in order to show more or less information, for example, the user may press the widget for a certain period in order to make the widget into an editable state, in which the size and position of the widget in the card may be changed in response to user's operation. The card may be automatically resized in adaption to the changed size and/or position of the widget. For example, as illustrated in FIG. 5B, the widget may be enlarged so as to present more contents, and the size of the card may be enlarged adaptively, resulting to a further customized widget card 270A.

Figure 5C:
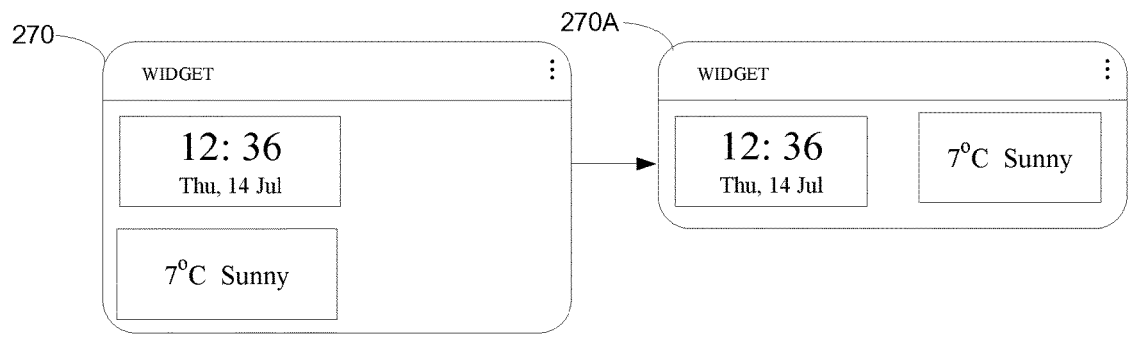

In an implementation, more than one widget may be added to the widget card 270. The UI 510 in FIG. 5A may include a button 512 for choosing multiple widgets. A multi-choosing mode may be entered after the button 512 is pressed, and one or more widgets may be chosen by a user to be added into the widget card 270. For example, as illustrated in FIG. 5C, two exemplary widgets such as a clock widget and a weather widget may be added into the widget card 270. As mentioned above, the position of the widget such as the weather widget may be changed in the card 270, and the size of the border of the card 270 may be resized in adaption to the change of position of the widget, resulting in the further customized card 270A. By customizing this card 270A, the user may view the time and weather conveniently in the way the user likes.

In an implementation, the background, the border style of the card may be customized. For example, the background of a widget may be close to the background of a card. The background color of the card may be customized to be transparent or a solid color, the border around the card may be customized to be visible or invisible, so that the widget may be put in a card with ideal appearance. It should be appreciated that the adaption of size, background color and border format are applicable to any customizable card in addition to the widget card.

Figure 5D:
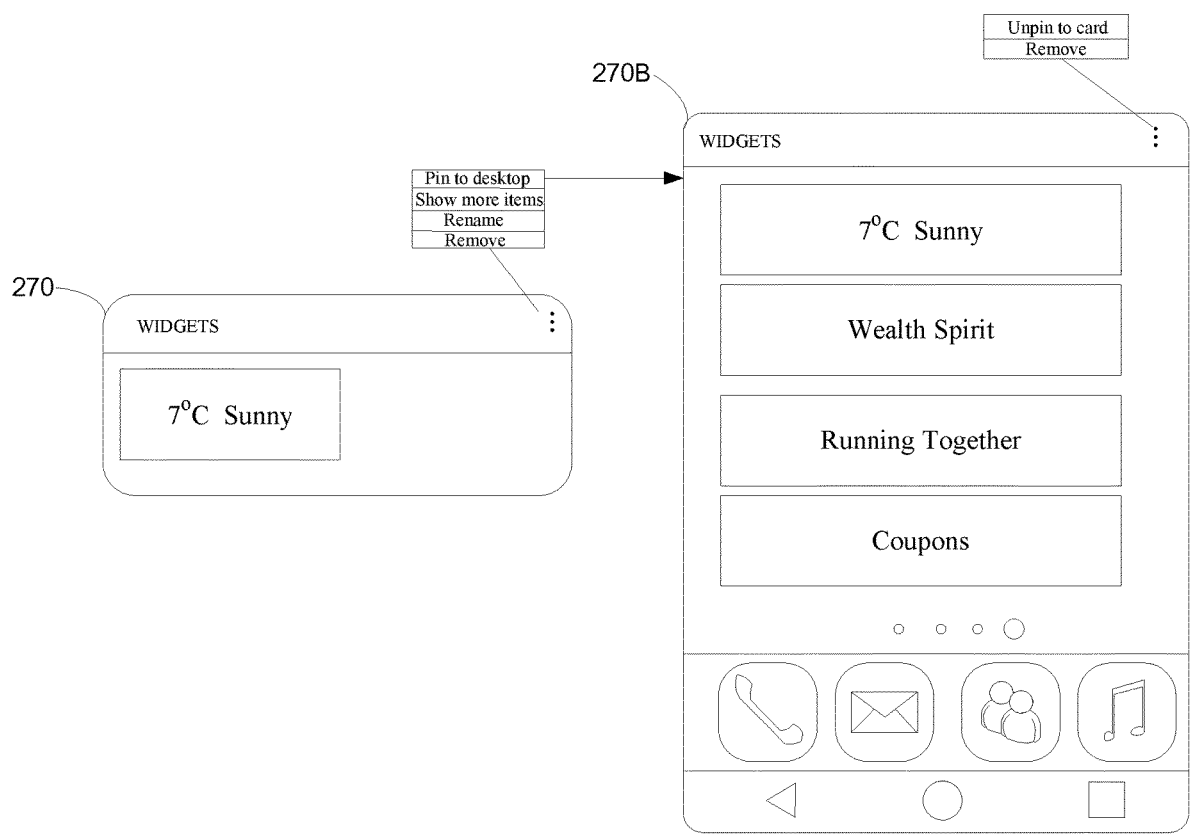

In an implementation, when multiple widgets are added into the widget card 270, only one of them is presented in the card or only a limited number of widgets among them are presented in the card. For example, as illustrated in FIG. 5D, four exemplary widgets are added into the widget card 270 and only the clock widget is presented in the widget 270.

A menu is presented when the three black dots in the card 270 is pressed by a user. As shown in FIG. 5D, the menu includes elements "Pin to desktop", "Show more items", "Rename" and "Remove". It should be appreciated that more or less elements may be included in the menu.

When the element "Pin to desktop" is operated or selected, a page 270B is presented in the displayer 150. In other words, the presentation of the card 270 is switched to the presentation of the page 270B in the UI of the launcher. As indicated by the bigger circle among the four circles shown in the page 270B, the page 270B occupies a new screen other than the three screens as shown in FIG. 1. The page 270B having the same category of the card 270 may occupy the full screen and may even be a scrollable page, and thus may accommodate much more contents or content related items than the corresponding card 270. The widgets in the page 270B are illustrated with their names "Wealth Spirit", "Running Together" and "Coupons" for sake of simplicity, it should be appreciated that the contents and functions of the widgets should be presented in the widgets in the widget page 270B for fast accessing by the user. In this way, the user may group multiple widgets of interest together and access the contents of the widgets quickly without needing to open the applications corresponding to the widgets.

It should be appreciated that the shown element "Pin to desktop" is just an example, various manners for switching the presentation of a card to the presentation of a page are applicable. For example, a specific gesture performed to the card on the displayer having a touching screen may be identified as a user input indicating switching the presentation of a card to the presentation of a page.

The "show more items" element in the menu, when operated or chosen, would allow the card 270 to extend larger so as to present more items, which may be more widgets or may be more items in one widget such as the mailbox widget shown in FIG. 5B. For example, the content area of the card 270 may extend twofold as large as the original size so as to accommodate a double number of content related items. In the extended card, the "show more items" element would become a "show less items" element, which, when operated or chosen, would allow the extended card to return to its original size. The "show more items" element and "show less items" element may also be referred to as unfolding and folding.

The "rename" element in the menu, when operated or chosen, would allow the user to rename the card 270. For example, the current name "WIDGETS" of the card 270 may be renamed as another name such as "living widgets".

The "remove" element in the menu, when operated or chosen, would cause the card 270 to be removed from the card list of the launcher. In an implementation, when the "remove" element in the card is operated or chosen, both the card 270 and the corresponding page 270B are removed. In this case, as the more convenient card is removed by the user, it is derived that the corresponding page is not desirable for the user and thus may be removed concurrently so as to save computing and memory resources.

An "unpin to card" element and a "remove" element are provided in the menu associated with the three black dots in the page 270B. When the "unpin to card" element is operated or chosen, the presentation of the page 270B would be switched to the presentation of the card 270. The "remove" element, when operated or chosen, would cause the page to be removed from the launcher. In an implementation, when the "remove" element in the page is operated or chosen, only the page 270B is removed while the card 270 is remained.

It should be appreciated that more or less elements may be provided in the menu of the card and/or the page. It is not necessary to implement all the elements in the menu as shown in FIG. 5D and in other FIGURES. The functions of some elements may also be implemented in other ways, for example, the "remove" element or the "unpin to card" element may be implemented by a specific finger gesture performed on the page.

Figure 6A:
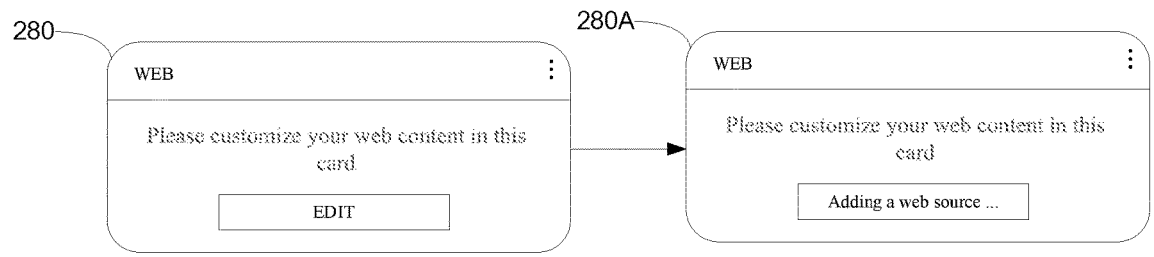

FIG. 6A illustrates an exemplary editing of a web card according to an embodiment. The user may press the EDIT button on the web card 280 in the card list of the launcher shown in FIG. 4. In an implementation as illustrated in FIG. 6A, after receiving the user input, an inputting box may be activated to receiving user input in the web card 280A. Information indicating a web source may be input in the inputting box. The information of a web source may be a Uniform Resource Locator (URL), which indicates the source of web content such as Really Simple Syndication (RSS) feed, new feed, social medium feed, dashboard portal and so on. The URL may be set in the web card in order for the web card to obtain contents from the URL. It should be appreciated that the inputting box may also be initially arranged in place of the EDIT button in the card 280.

Figure 6B:
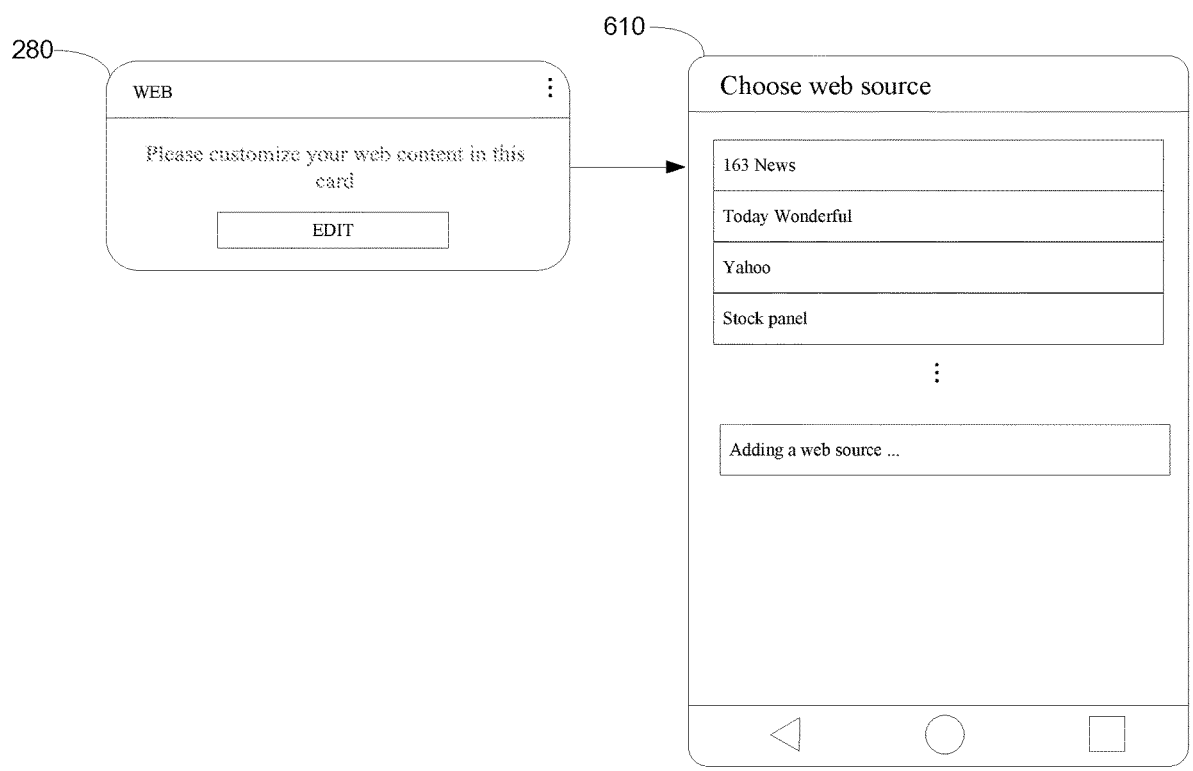

FIG. 6B illustrates an exemplary editing of a web card according to an embodiment. A setting interface 610 may be presented in response to a user's operation on the EDIT button in the web card 280. The setting interface 610 may provide a list of available web sources, such as "163 News", "Today Wonderful", "Yahoo", "Stock panel" as illustrated, which may be chosen by the user to customize the web card 280. In addition, an inputting box may also be provided in the setting interface 610 in order for the user to input URL information for a special web source.

Figure 6C:
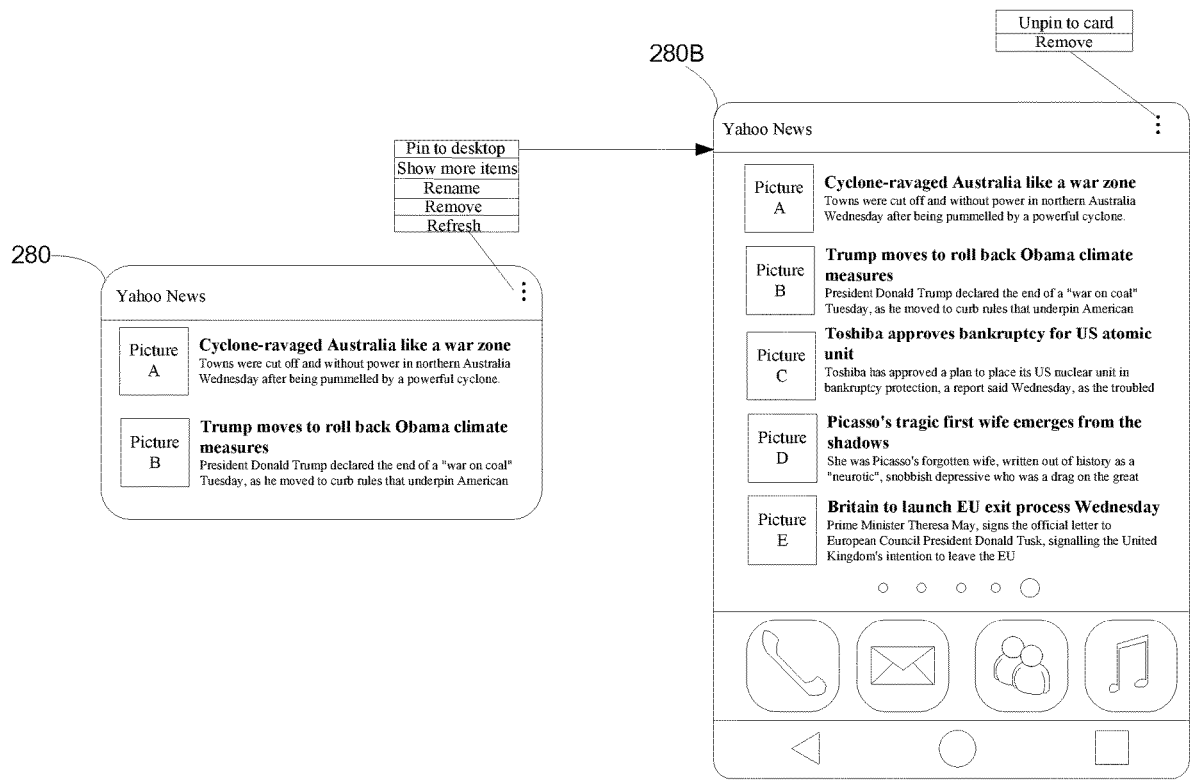

FIG. 6C illustrates an exemplary customized card 280 which is customized via the interface illustrated in FIG. 6A or FIG. 6B. In the example illustrated in FIG. 6C, the URL of web content "Yahoo News" is set in the web card 280. The web contents such as the News may be parsed and presented in a predetermined format in the web card 280. For example, as illustrated in FIG. 6C, a representative picture or thumbnail and a textual headline may be presented for each item of News in the web card 280. The headlines allow a user to get a quick understanding of the news. The user may press an item in the card, and then the detailed content corresponding to the item may be presented in a browser such as a default browser installed on the computing device 100.

A menu is presented when the three black dots in the card 280 is pressed by a user. As shown in FIG. 6C, the menu includes elements "Pin to desktop", "Show more items", "Rename" and "Remove". The functions of the elements in the menu are similar to those in the widget card illustrated in FIG. 5D. It should be appreciated that more or less elements may be included in the menu.

The menu may also include a "Refresh" element. The web card may retrieve contents from the web source when the user presses the "Refresh" element. Of course, the web card may periodically refresh the presented content without having to receive the refreshing instruction from the user. It should be appreciated that the "Refresh" element may be arranged in a more convenient position, for example, may be arranged at the bottom of the web card in order for the user to quickly operate this function.

When the element "Pin to desktop" is operated or selected, a page 280B is presented in the displayer 150. In other words, the presentation of the web card 280 is switched to the presentation of the page 280B in the UI of the launcher. As indicated by the bigger circle among the five circles shown in the page 280B, the page 280B occupies a new screen other than the four screens as shown in FIG. 5D. The page 280B having the same category of the card 280 may occupy the full screen and may even be a scrollable page, and thus may accommodate much more contents or content related items than the corresponding card 280. Taking the News page 280B as an example, the page 280B presents much more News items and thus allows the user to view the News more conveniently.

An "unpin to card" element and a "remove" element are provided in the menu associated with the three black dots in the page 280B. The functions of the "unpin to card" element and a "remove" element are similar to those in the widget page 270B illustrated in FIG. 5D.

Figure 7A:
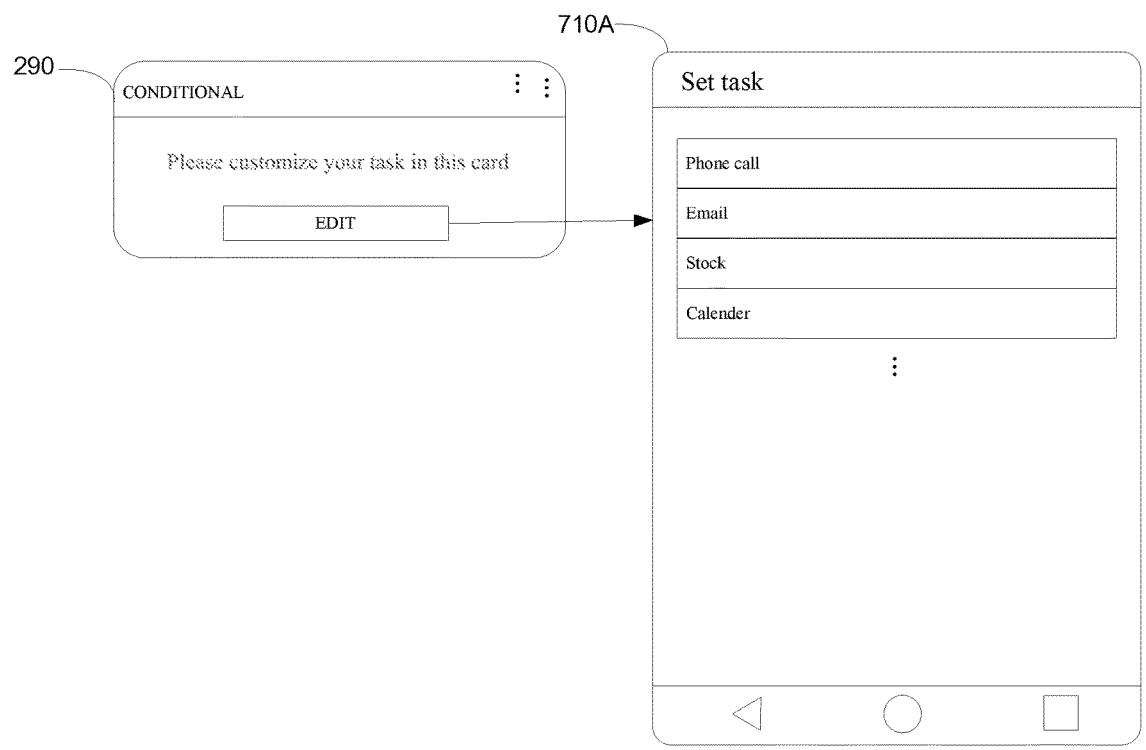

FIG. 7A illustrates an exemplary editing of a conditional card according to an embodiment. The user may press the EDIT button on the conditional card 290 in the card list of the launcher shown in FIG. 4. In an implementation as illustrated in FIG. 7A, a setting interface 710A may be presented in response to the user input on the EDIT button in the web card 290. The setting interface 710A may provide a list of available tasks supported by the card 290, such as "Phone call", "Email", "Stock", "Calendar" as illustrated, which may be chosen by the user to customize a task in the conditional card 290.

Figure 7B:
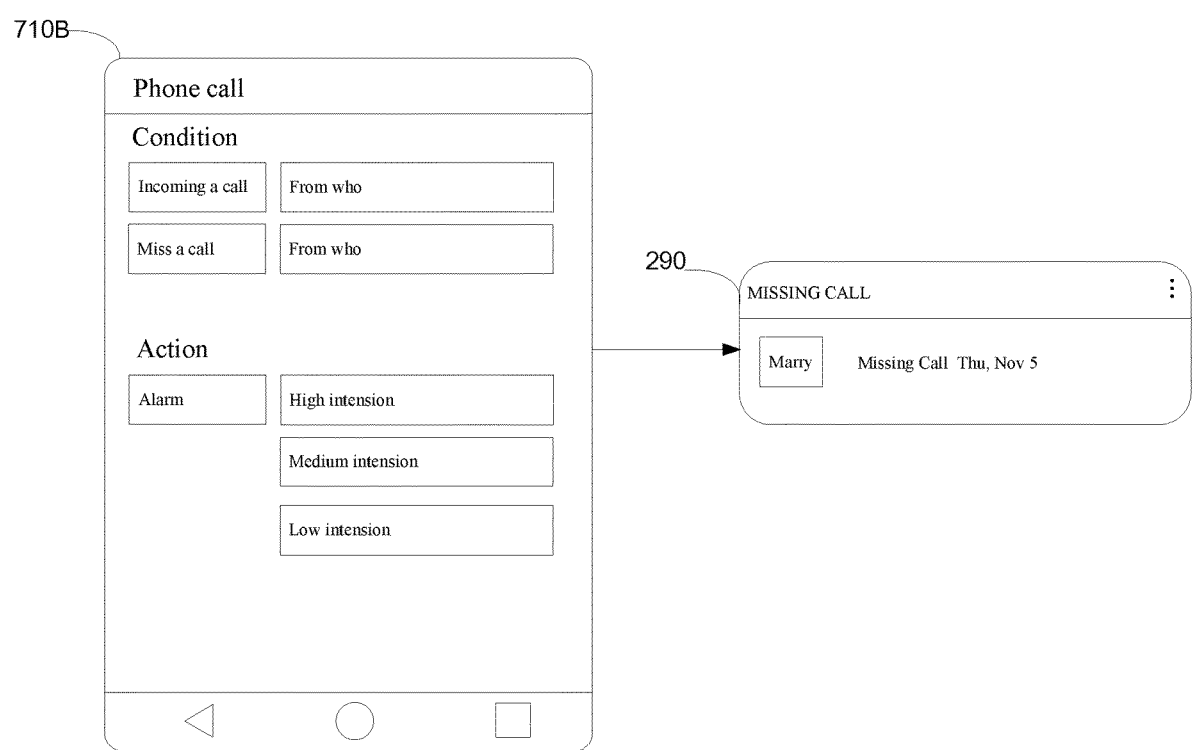

The setting interface 710B illustrated in FIG. 7B is presented when the "Phone call" is selected in the interface 710. The setting interface 710B includes exemplary conditions and actions that may be customized by the user. As illustrated, the conditions may include "incoming a call" or "missing a call" from somebody. For example, the user may select the condition "missing a call" and set the related phone number via the "from who" element. The related phone number may be set by selecting a contact from the contacts stored in the computing device 100, and may also be set by inputting the number manually by a user.

The action may include "Alarm" as well as the intention of the alarm. An example of the high intension may be that the alarm is performed with high sounds and intensive vibrations and would not stop until the user manually turns off it. An example of the medium intention may be that the alarm is performed with high sounds and intensive vibrations periodically. An example of the low intention may be that the alarm is performed with lower sounds periodically. Other manners of alarm may be applicable, for example, the background color of the card may be changed to a noticeable color, or the like.

For example, the user may set the condition as "missing a call from Mary" and set the action as "Alarm with high intension". Then the customized conditional card may be presented in the card list of the launcher, and may also be invisible until the customized condition occurs. In this example, the customized conditional card may monitor incoming call of the specific number through the system API or the system message center. When the incoming call from the specific number occurs but is not accepted by the user, the customized condition occurs and the alarm would be presented.

Figure 7C:
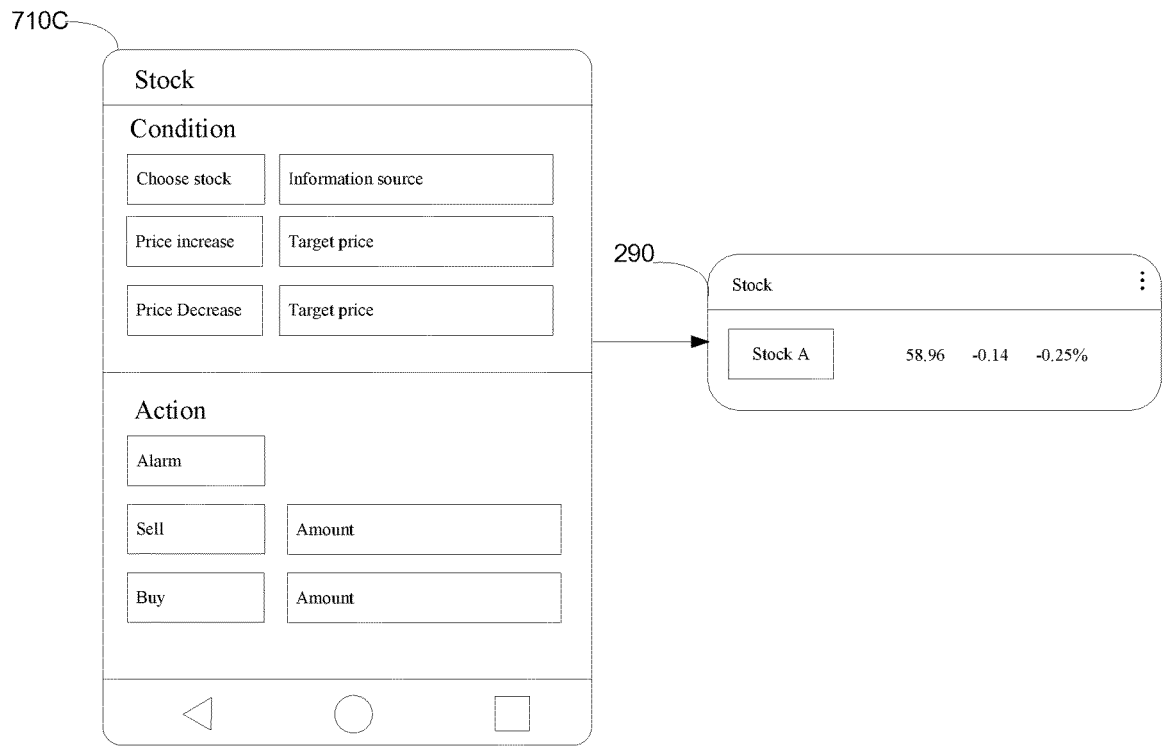

The setting interface 710C illustrated in FIG. 7C is presented when the "Stock" is selected in the interface 710A. The setting interface 710C includes exemplary conditions and actions that may be customized by the user. As illustrated, the conditions may include "choosing stock" and may optionally include "information source" of the stock. The conditions may include "price increase" or "price decrease" as well as the corresponding target prices. For example, the user may select a specific stock via the "choose stock" button, then the customized card 290 may monitor the information of the selected stock. As another example, some special stocks may not be available in the card 290, and the user may still set such a stock in the card 290 by specifying the information source of the stock, such as a URL which provides the information of the stock. Then the user may choose the "price increase" or the "price decrease" and set the corresponding target prices as the condition. The action may include "Alarm", "sell", "buy" and "amount" corresponding to the "sell" or "buy", which may be customized by the user.

For example, the user may set the condition as "Price increase of Company A's stock to a target price such as 100 dollar", and set the action as "Alarm" and/or "sell 1000 shares".

With the setting of the conditions and the actions, the customized stock card 290 may be presented in the card list. For example, the customized stock such as stock A may be presented with brief stock information in the stock card before the customized condition has not occurred. When the customized condition comes into effect, the actions of selling a predetermined amount of the stocks and alarming the user may be performed by the conditional stock card.

It should be appreciated that one or more conditions may be set in one conditional card, and a part or all of the conditions may be in a AND or OR relation, and accordingly one or more actions may also be set in response to a part or all of the conditions in one conditional card. For example, a price increase condition as well as a corresponding buy action may be set for a specific stock in one conditional card, and a price decrease condition as well as a corresponding sell action may also be set for the specific stock in the conditional card.

Figure 7D:
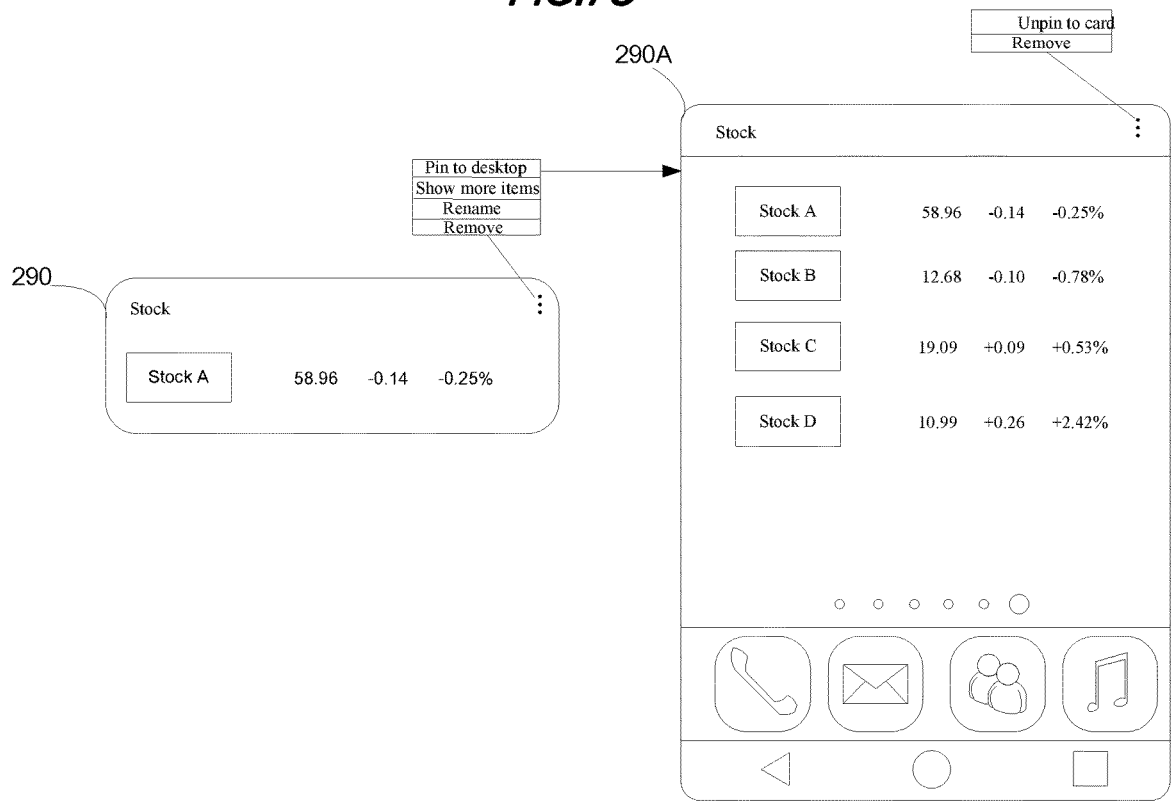

In an implementation, multiple stocks may be set in the conditional card 290. Only a subset of the customized stocks is presented in conditional stock card 290 as illustrated in FIG. 7D, and the card 290 may be switched to a corresponding page 290A, in which all the customized stocks may be presented along with brief stock information. This allows the user to view the multiple stocks of interest in a single stock page conveniently.

Although FIG. 7A illustrates a multi-function conditional card which supports different types of conditional tasks, it should be appreciated that one conditional card may only support a specific kind of task such as the phone call, or the email, or the stock, or the calendar, or the like. It should be appreciated that various conditional cards may be implemented in addition to those described above. Examples of the conditional cards may be an event reminder card, e.g., the condition is a birthday and the action is reminder to buy gift, a threshold reminder card, e.g., the above mentioned conditional stock card or a conditional price card, and a message reminder card, e.g., the condition may be an email, short message or instant messaging (IM) message received from a specific person and the action may be respond automatically and alarming to the user.

Although the customized cards 270 to 290 illustrated in the Figures do not include an EDIT button, it's appreciated that the EDIT button may be reserved at the customized cards to allow further editing or customizing of the customized cards.

The cards 210 to 250 may also be switched into corresponding pages which may provide and present a super set of contents and functions of the cards. In other words, the cards 210 to 250 provide a subset of the contents and/or functions provided in the corresponding pages. The switching of the presentation of the cards 210 to 250 is not illustrated in the Figures for sake of simplicity.

Figure 8:
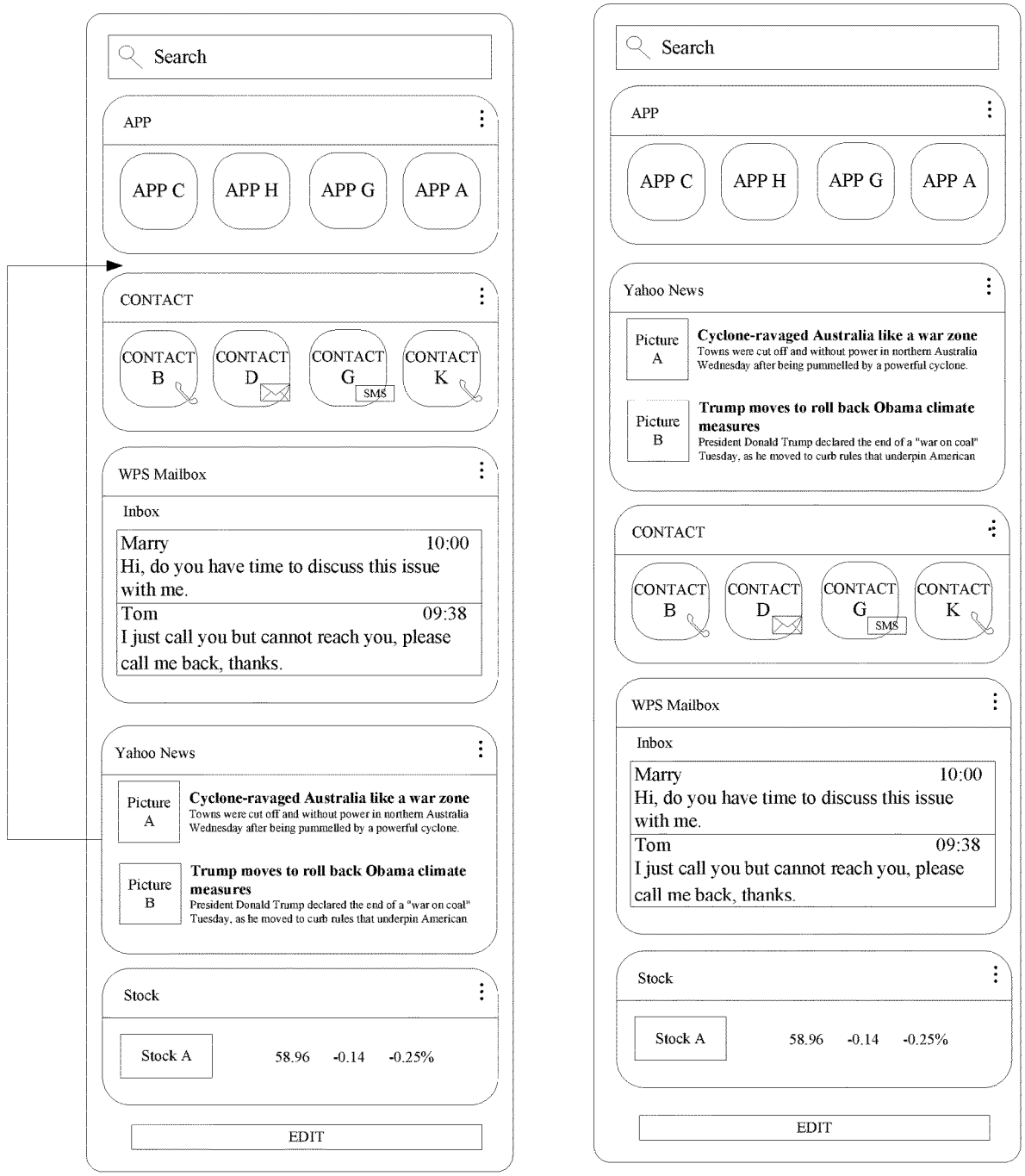

FIG. 8 illustrates the operation of a group of cards according to an embodiment. In an implementation, the order of the cards may be changed in the screen in response to a user input or a user operation. For example, when a card such as the web card named Yahoo News is continuously pressed for a predetermined time length, the card may be in a movable state and may be moved to a position among the group of cards. As shown in FIG. 8, the web card, which is more likely to be viewed by a user, may be moved to the more convenient position which is between the APP card and the CONTACT card. The pressing and/or other operating on the card may be performed by using a hardware such as the user's finger, a cursor positioning device, a touching pen, and may be performed through a NUI.

Figure 9:
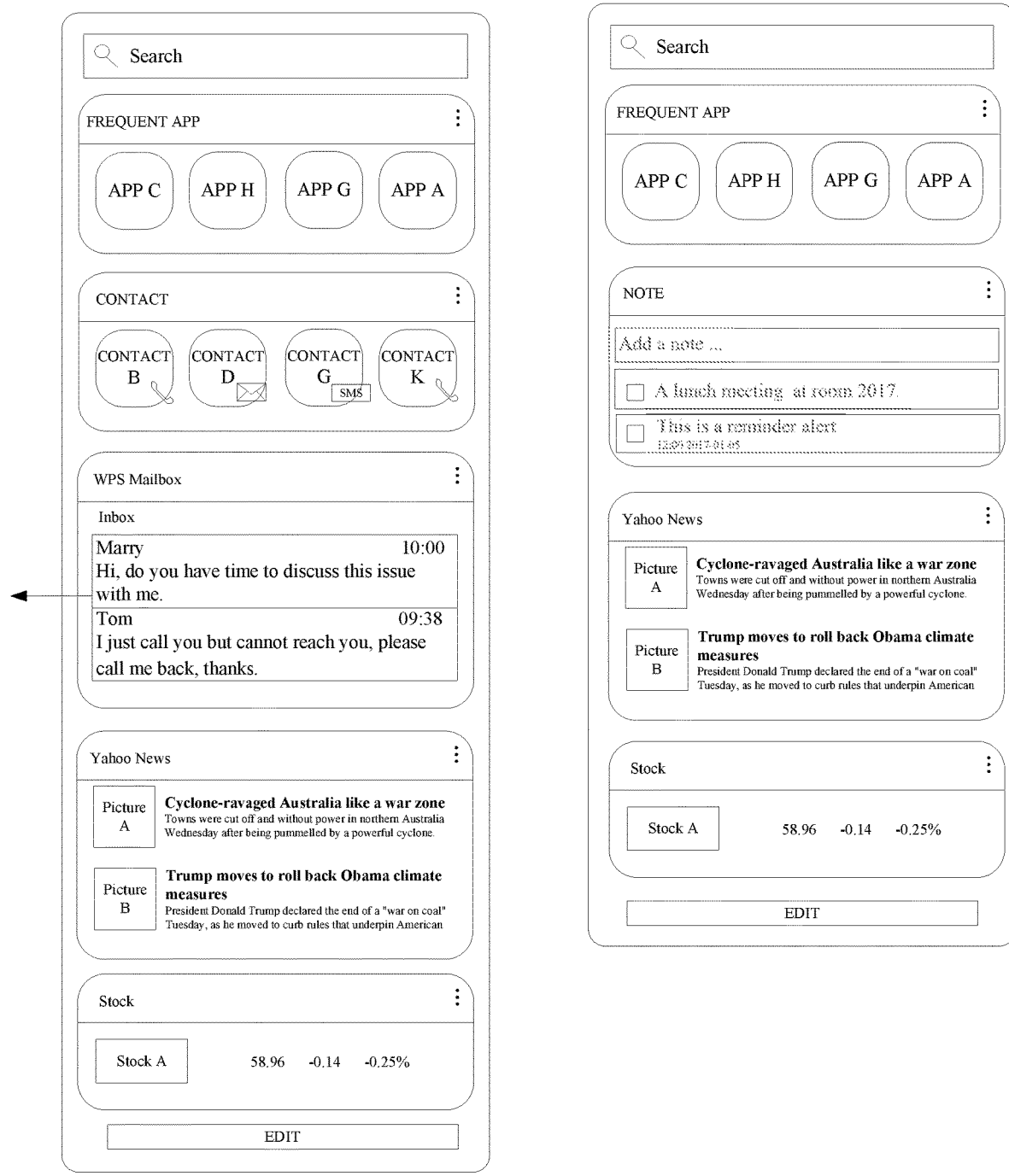

FIG. 9 illustrates the operation of a group of cards according to an embodiment. In an implementation, a card may be removed or demolished from the screen in response to a user input or a user operation. For example, when a card such as the widget card named WPS Mailbox is continuously pressed for a predetermined time length, the card may be in a movable state, in which a certain gesture, such as a swipe to the left, performed on the card may be used to remove the card. Alternatively, as discussed above, the card may also be removed by choosing the remove button in the menu of the card. In an implementation, in response to the removing operation to a card, both the card and the corresponding page are removed from the UI of the launcher.

Figure 10:
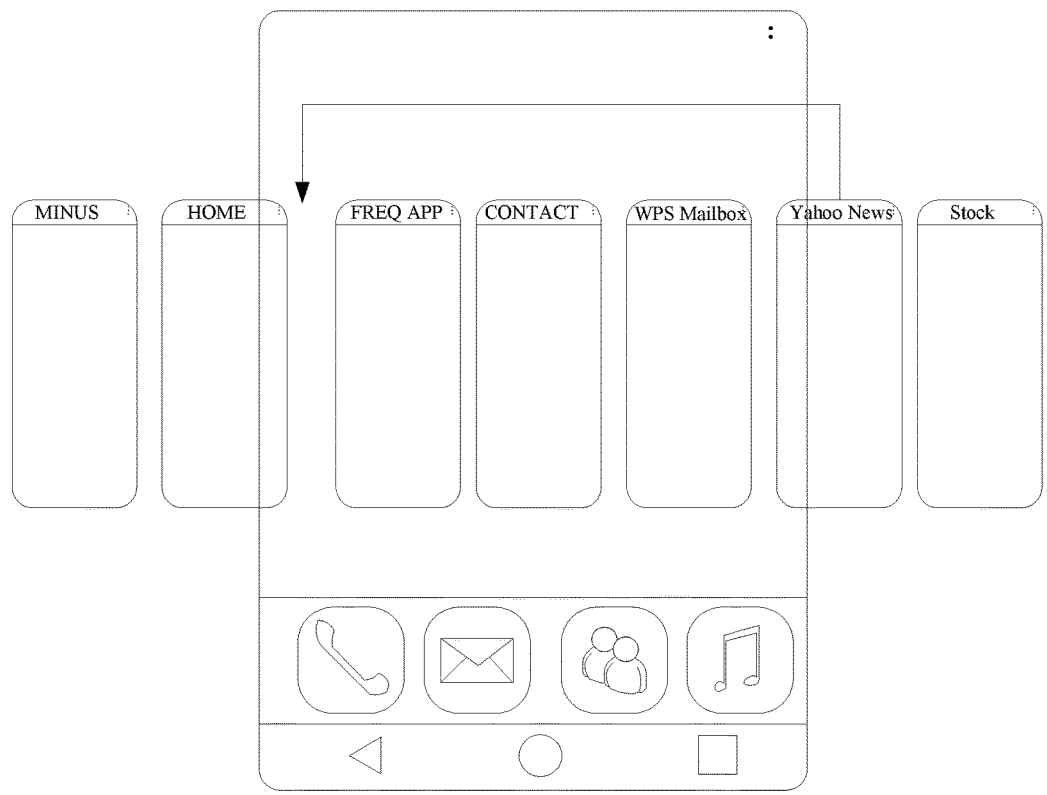
Figure 10:
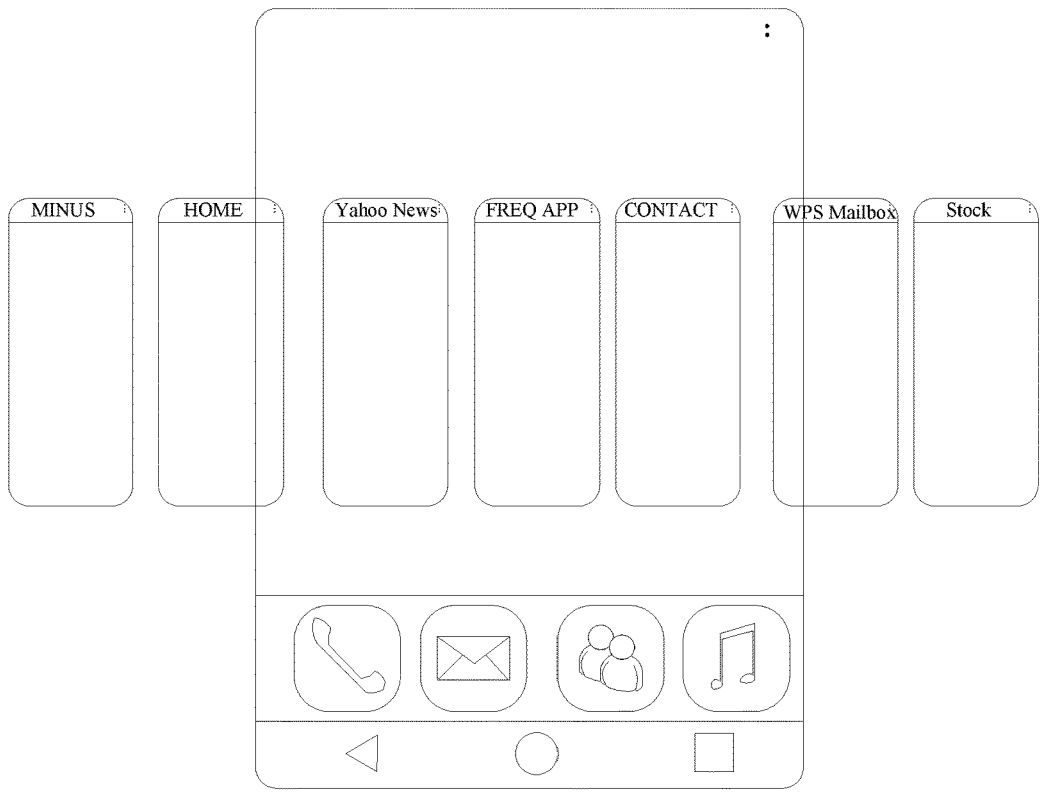

FIG. 10 illustrates the operation of a group of pages or screens according to an embodiment. In an implementation, the order of the pages may be changed in response to a user input or a user operation. A page movable state as shown in FIG. 10 may be entered by a certain user input or user operation, such as a long pressing of a page or a long pressing of the home key as shown by the little circle in the bottom of the computing device. It should be appreciated that FIG. 10 schematically shows the order of the movable screens or pages, which may be presented in the displayer in a slidable manner. A page may be moved to a position among the group of pages or screens in the page movable state. As shown in FIG. 10, the web page named Yahoo News may be moved to the position before the FREQUENT APP page. Then the user may quickly switch among the minus one screen, the home screen, and the web page by least operations such as swipe operations to the screens in the UI of the launcher.

Figure 11:
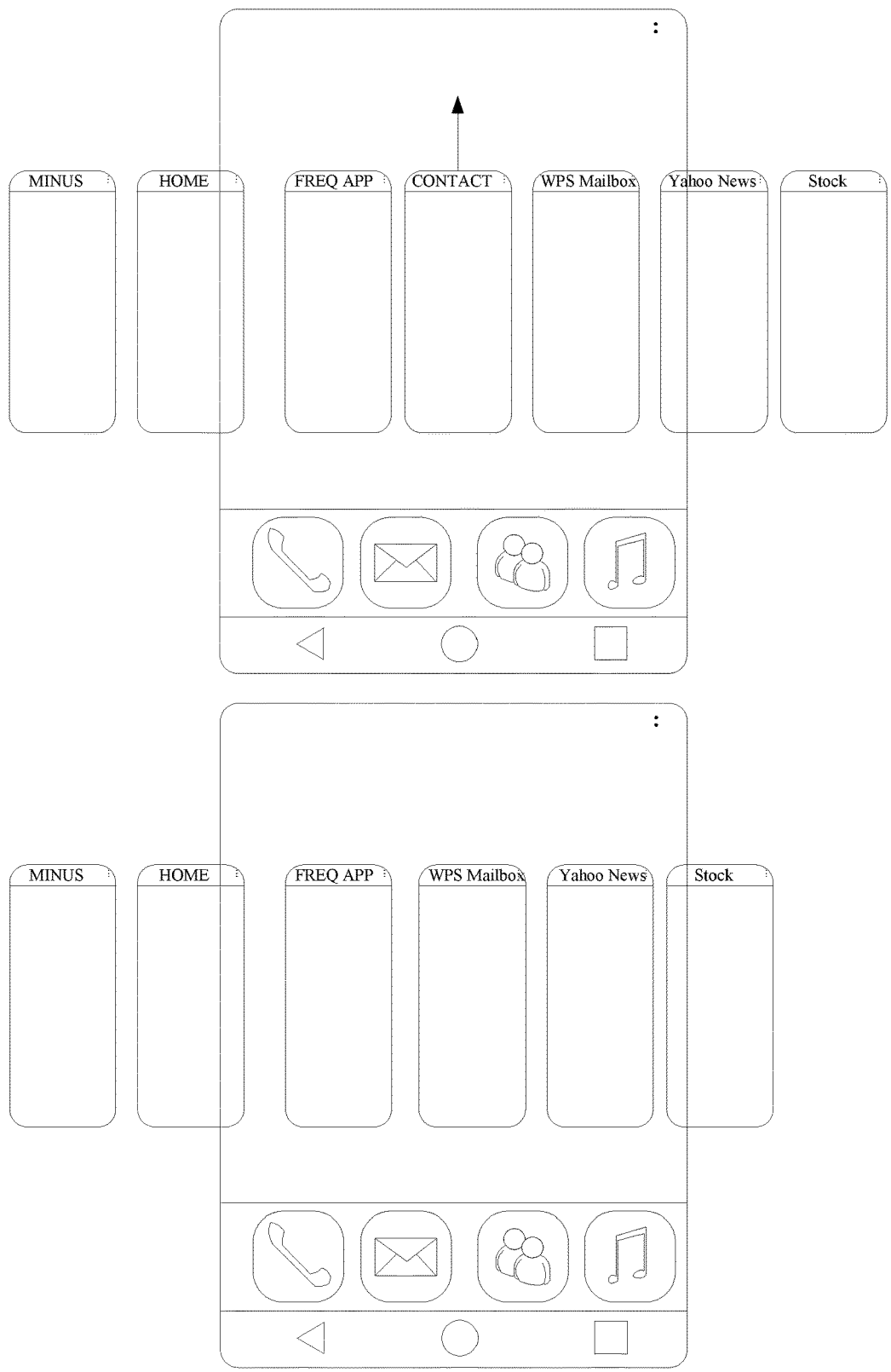

FIG. 11 illustrates the operation of a group of pages or screens according to an embodiment. In an implementation, a page may be removed or demolished from among the pages in response to a user input or a user operation. For example, a page such as the CONTACT page may be removed in the page movable state in response to a certain gesture, such as a swipe to the up, performed on the page. Alternatively, as discussed above, the page may also be removed by choosing the remove button in the menu of the page.

Figure 12:
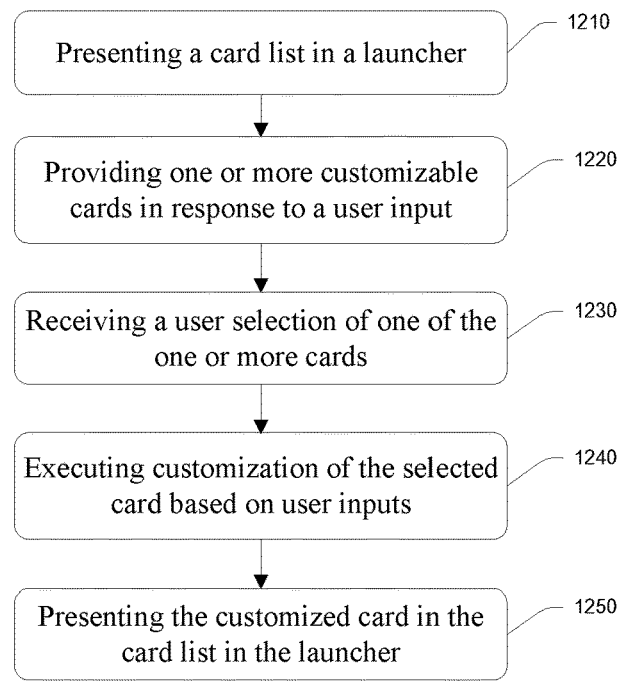
FIG. 12 is a flowchart of an exemplary method for providing a user customized card in a launcher according to an embodiment.

FIG. 12 illustrates a method for providing a user customized card in a launcher according to an embodiment. At 1210, a card list including one or more cards is presented in the launcher. At 1220, one or more customizable cards are provided in response to a user input. The user input may be an operation on the EDIT button which indicates editing of the card list. The one or more customizable cards may include at least one of a widget card, a web card and a conditional card. At 1230, a user selection of one of the one or more cards may be received. At 1240, customization of the selected card may be executed based on user inputs. At 1250, the customized card may be presented in the card list.

In an implementation, the selected card is a widget card. Available widgets are presented in response to a user input. The user input may be an operation on the ADD WIDGET button which indicates the editing of the widget card. At least one widget may be selected from the available widgets and accordingly incorporated in the widget card. The size and/or position of the at least one widget may be changed in the widget card in response to a user input. The size of the widget card may be changed in adaption to the size and/or position of the at least one widget. At least one of border style and background of the widget card may be changed in response to a user input.

In an implementation, at least a part of the at least one widget may be presented in the widget card. The widget card may be switched to a widget page and all of the at least one widget may be presented in the widget page.

In an implementation, the selected card is a web card. Information indicating a web source may be set in the web card in response to a user input of the information. The user input may be a selection from available candidate web sources, and may be a text input of the web source. Contents are received from the web source, and at least a part of the contents is presented in a predefined format in the customized web card. The web card may be switched to a web page, and at least a part of the contents may be presented in the web page, wherein the contents presented in the web card is a subset of the contents presented in the web page.

In an implementation, the selected card is a conditional card. Condition information and action information corresponding to the condition information are set in the conditional card in response to a user input, so as to customize the condition card. The customized condition card monitors at least one condition indicated by the condition information, and performs at least one action once identifying that the at least one condition is met.

Figure 13:
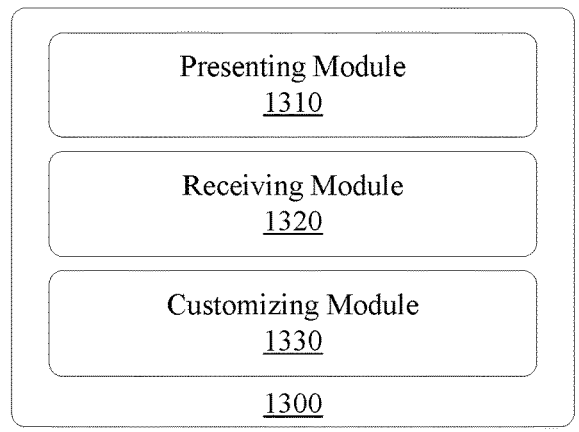
FIG. 13 illustrates an exemplary apparatus for providing a user customized card in a launcher according to an embodiment.

FIG. 13 illustrates an exemplary apparatus 1300 for providing a user customized card in a launcher. The apparatus 1300 comprises a presenting module 1310, a receiving module 1320 and a customizing module 1330. The presenting module 1310 is configured to present a card list in the launcher, and present representations of one or more customizable cards in response to a user input. The representations of the cards may be those representations illustrated in FIG. 3A and FIG. 3B, and may be in any other suitable format as long as they may represent the cards. It should be appreciated that the representation of a card may also be the card itself.

The receiving module 1320 is configured to receive a selection of one of the one or more customizable cards. The one or more cards may include at least one of a widget card, a web card and a conditional card. The customizing module 1330 is configured to execute customization of the selected card based on user inputs. The presenting module 1310 is configured to present the customized card in the card list in the launcher.

In an implementation, the selected card is a widget card. The presenting module 1310 is configured to present available widgets in response to a user input indicating the editing of the widget card. The customizing module 1330 is configured to incorporate at least one widget selected from the available widgets in the widget card. In an implementation, the customizing module 1330 is configured to change size and/or position of the at least one widget in the widget card in response to a user input. In an implementation, the customizing module 1330 is configured to change size of the widget card in adaption to the size and/or position of the at least one widget. In an implementation, the customizing module 1330 is configured to change at least one of border style and background of the widget card in response to a user input.

In an implementation, the apparatus 1300 may also comprise a switching module configured to switch a card to a page. The switch module may be configured to switch the widget card to a widget page. The presenting module 1310 is configured to present at least a part of the at least one widget in the widget card, and present all of the at least one widget in the widget page.

In an implementation, the card is a web card. The customizing module 1330 is configured to set information indicating a web source in the web card in response to user input of the information. The presenting module 1310 is further configured to present at least a part of contents received from the web source in a predefined format in the web card.

In an implementation, the switch module may be configured to switch the web card to a web page. The presenting module 1310 is configured to present at least a part of the contents in the web page, wherein the contents presented in the web card is a subset of the contents presented in the web page.

In an implementation, the card is a conditional card. The customizing module 1330 is configured to set condition information and action information corresponding to the condition information in the conditional card in response to a user input so as to customize the conditional card.

In an implementation, the apparatus may also comprise a monitoring module configured to monitor at least one condition indicated by the condition information. The apparatus may also comprise an acting module configured to perform at least one action once the at least one condition occurs.

The apparatus 1300 may also comprise any other modules configured for performing any operations of the methods for providing user customized cards according to the various embodiments as mentioned above.

Figure 14:
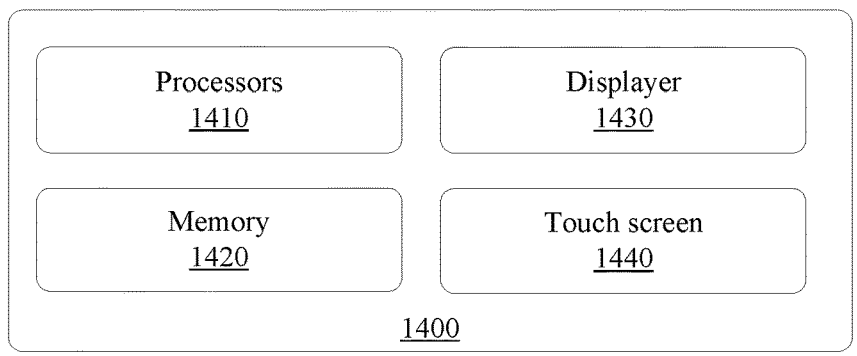
FIG. 14 illustrates an exemplary computing system according to an embodiment.

FIG. 14 illustrates an exemplary system 1400 for providing a user customized card in a launcher according to an embodiment.

The system 1400 may comprise one or more processors 1410. The system 1400 may further comprise a memory 1420 that is connected with the one or more processors 1410. The memory 1420 may store computer-executable instructions that, when executed, cause the one or more processors 1410 to run a desktop launcher. The system 1400 may further comprise a displayer 1430 for displaying a UI of the desktop launcher, the UI includes a card list in a screen of the launcher. The system 1400 may further comprise an input unit 1440 for receiving a user input via the UI. The input unit 1440 is illustrated as a touch screen 1440 in FIG. 14. It should be appreciated that any input unit may be applicable in the disclosure, for example, a cursor control device, a camera supporting a NUI, and so on. Although the touch screen 1440 is illustrated as a separate unit from the displayer, it's also possible to integrate the touch screen 1440 in the displayer 1430.

The computer-executable instructions, when executed, further cause the one or more processors 1410 to provide one or more customizable cards in response to a user input, receive a user selection of one of the one or more cards, execute customization of the selected card based on user inputs, and present the customized card in the card list.

The computer-executable instructions, when executed, cause the one or more processors 1410 to perform any operations of the methods for presenting a user customized card according to the embodiments as mentioned above.

The embodiments of the present disclosure may be embodied in a non-transitory computer-readable medium. The non-transitory computer-readable medium may comprise instructions that, when executed, cause one or more processors to perform any operations of the methods for providing user customized cards according to the embodiments as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

We claim:

1. A method for providing a user customized card in a launcher, said method comprising:
   presenting a user interface (UI) configured to allow a user to edit a card list, wherein:
      the UI includes a card list area comprising representations of card types for any cards that are currently included in the card list,
      the UI includes a candidate area comprising a representation of a card type for a card that is available for inclusion in the card list, and
      in response to the card being added to the card list, representations for the card type are simultaneously displayed in both the card list area and the candidate area;
   presenting the card list in the launcher;
   providing one or more customizable cards in response to a user input, wherein providing the one or more customizable cards is facilitated via the UI;
   receiving a user selection of one of the one or more customizable cards;
   executing customization of the selected card based on user inputs; and
   presenting the customized card in the card list.

2. The method of claim 1, wherein the one or more customizable cards include at least one of a widget card, a web card, and a conditional card.

3. The method of claim 2, wherein the selected card is the widget card, and wherein executing the customization of the selected card comprises:
   presenting available widgets in response to a user input; and
   incorporating at least one widget selected from the available widgets in the widget card.

4. The method of claim 3, wherein executing the customization of the selected card comprises:
   changing a size and/or a position of the at least one widget in the widget card in response to a second user input; and/or
   changing a size of the widget card in adaptation to the size and/or the position of the at least one widget; and/or
   changing at least one of a border style and a background of the widget card in response to a third user input.

5. The method of claim 3, further comprising:
   presenting at least a part of the at least one widget in the widget card; and/or
   switching the widget card to a widget page and presenting the at least one widget in the widget page.

6. The method of claim 2, wherein the selected card is the web card, and wherein executing the customization of the selected card comprises:
   setting information indicating a web source in the web card in response to a user input of the information.

7. The method of claim 6, further comprising:
   receiving first content from the web source; and
   presenting the first content in a predefined format in the web card.

8. The method of claim 7, further comprising:
   switching the web card to a web page; and
   presenting second content in the web page, wherein the first content presented in the web card is a subset of the second content presented in the web page.

9. The method of claim 2, wherein the selected card is the conditional card, and wherein executing the customization of the selected card comprises:
   setting condition information and action information corresponding to the condition information in the conditional card in response to a user input.

10. The method of claim 9, further comprising:
    monitoring at least one condition indicated by the condition information; and
    performing at least one action once identifying that the at least one condition is met.

11. A computer system configured to provide a card list comprising one or more customizable cards, said computer system comprising:
    one or more processors; and
    one or more computer-readable hardware storage devices that store instructions that are executable by the one or more processors to cause the computer system to:
       present a user interface (UI) configured to allow a user to edit the card list, wherein:
          the UI includes a card list area comprising representations of card types for any cards that are currently included in the card list,
          the UI includes a candidate area comprising a representation of a card type for a card that is available for inclusion in the card list, and
          in response to the card being added to the card list, representations for the card type are simultaneously displayed in both the card list area and the candidate area;
       add the card to the card list, wherein the card is a customizable card, and wherein adding the card to the card list is facilitated via the UI;
       execute customization of the customizable card based on a user input; and
       present the customized card in the card list.

12. The computer system of claim 11, wherein the card list includes all of a widget card, a web card, and a conditional card.

13. The computer system of claim 11, wherein the card types include a widget card type, a web card type, and a conditional card type.

14. The computer system of claim 13, wherein the card types further include a contact card type, a note card type, and a document card type.

15. The computer system of claim 11, wherein the card list includes a widget card, and wherein the widget card simultaneously includes a first widget and a second widget, the second widget being different than the first widget.

16. The computer system of claim 11, wherein the card list includes a conditional card, and wherein the conditional card includes multiple different conditions that are being monitored.

17. The computer system of claim 11, wherein the card list includes a conditional card that is configured to monitor a condition, and wherein the conditional card remains invisible in the card list until such time as the condition occurs.

18. The computer system of claim 11, wherein the card list includes a widget card that simultaneously comprises a plurality of widgets, and
    wherein only a single widget included in the plurality of widgets is presented in the widget card despite the widget card including the plurality of widgets.

19. The computer system of claim 11, wherein the card list includes a widget card that simultaneously comprises a plurality of widgets,
- wherein only a subset of widgets included in the plurality of widgets are presented in the widget card, and
- wherein the subset of widgets includes at least two widgets.

20. A method for providing a card list comprising one or more customizable cards, said method comprising:
- presenting a user interface (UI) configured to allow a user to edit the card list, wherein:
  - the UI includes a card list area comprising representations of card types for any cards that are currently included in the card list,
  - the UI includes a candidate area comprising a representation of a card type for a card that is available for inclusion in the card list, and
  - in response to the card being added to the card list, representations for the card type are simultaneously displayed in both the card list area and the candidate area;
- adding the card to the card list, wherein the card is a customizable card, and wherein adding the card to the card list is facilitated via the UI;
- executing customization of the customizable card based on a user input; and
- presenting the customized card in the card list.

\* \* \* \* \*